(12) United States Patent
Bhar et al.

(10) Patent No.: US 12,373,406 B2
(45) Date of Patent: Jul. 29, 2025

(54) EFFICIENT DATA MIGRATION IN ENTERPRISE RESOURCE PLANNING SYSTEMS

(71) Applicant: SAP SE, Walldorf (DE)

(72) Inventors: Arindam Bhar, West Bengal (IN); Ranjith Pr, Wayanad (IN); Vinutha Yediyur Varadarajalyengar, Bangalore (IN)

(73) Assignee: SAP SE, Walldorf (DE)

( * ) Notice: Subject to any disclaimer, the term of this patent is extended or adjusted under 35 U.S.C. 154(b) by 91 days.

(21) Appl. No.: 18/485,965

(22) Filed: Oct. 12, 2023

(65) Prior Publication Data

US 2025/0124009 A1  Apr. 17, 2025

(51) Int. Cl.
*G06F 16/20* (2019.01)
*G06F 16/21* (2019.01)
*G06F 16/23* (2019.01)
*G06F 16/84* (2019.01)

(52) U.S. Cl.
CPC ........ *G06F 16/214* (2019.01); *G06F 16/2365* (2019.01); *G06F 16/86* (2019.01)

(58) Field of Classification Search
CPC ..... G06F 16/214; G06F 16/2365; G06F 16/86
See application file for complete search history.

(56) References Cited

U.S. PATENT DOCUMENTS

| 2007/0179939 | A1* | 8/2007 | O'Neil | G06F 16/252 |
| 2015/0347540 | A1* | 12/2015 | Singh | G06F 16/254 |
| | | | | 707/602 |
| 2025/0021469 | A1* | 1/2025 | Anusuri | G06F 11/3684 |

OTHER PUBLICATIONS

Kulkarni, Sanket. "Implementing SAP S/4HANA." Implementing SAP S/4HANA (2019). (Year: 2019).*

* cited by examiner

*Primary Examiner* — Diedra McQuitery
(74) *Attorney, Agent, or Firm* — Mintz Levin Cohn Ferris Glovsky and Popeo, P.C.

(57) ABSTRACT

A system for migrating master data to a target system, comprising: at least one data processor; and at least one memory result in operations comprising: extracting the master data from a source database; validating the extracted master data at a database layer; mapping the validated master data to the target database specific datasets, and inserting the mapped master data into a target database, wherein the extraction, validation, mapping, and insertion are performed at the database layer.

20 Claims, 4 Drawing Sheets

EFFICIENT DATA MIGRATION IN ENTERPRISE RESOURCE PLANNING SYSTEMS

TECHNICAL FIELD

The subject matter described herein relates generally to data migration in Enterprise Resource Planning (ERP) systems.

BACKGROUND

ERP systems are comprehensive software solutions that integrate and manage various processes of an organization into a single system. These systems typically include modules for finance, human resources, manufacturing, supply chain, services, procurement, and others. Master data, a type of data shared by multiple processes and systems within an organization, is a foundational component of ERP systems. There exists needs for migrating Enterprise Resource Planning (ERP) master data to a target database.

SUMMARY

Methods, systems, and articles of manufacture, including computer program products, are provided for intelligent generation of unit tests. In one aspect, there is provided a system for migrating master data to a target system, comprising at least one data processor and at least one memory. The at least one memory may comprise program code that provides operations when executed by the at least one processor. The operations may comprise: extracting the master data from a source database; validating the extracted master data at a database layer; mapping the validated master data to a target database specific datasets, and, inserting the mapped master data into the target database, wherein the extraction, validation, mapping, and insertion are performed at the database layer.

In some variations, the operations further comprise validating the inserted data against a data model of the target database to ensure data integrity and accuracy.

In some variations, the master data is Enterprise Resource Planning (ERP) master data.

In some variations, the master data comprises customer data, vendor data, and contact person data.

In some variations, the validation comprises checking for errors in the master data, and logging error messages for erroneous data.

In some variations, the mapping comprises converting the master data to business partner specific data.

In some variations, the insertion comprises updating business partner tables in the target database with the mapped master data.

In some variations, the operations further comprise automating a maintenance of configuration settings associated with an organization and the master data with minimum manual intervention.

In another aspect, there is provided a computer-implemented method for migrating master data to a target system, comprising: extracting the master data from a source database; validating the extracted master data at a database layer; mapping the validated master data to a target database specific datasets, and, inserting the mapped master data into the target database, wherein the extraction, validation, mapping, and insertion are performed at the database layer.

In some variations, the method further comprises validating the inserted data against a data model of the target database to ensure data integrity and accuracy.

In some variations, the master data is Enterprise Resource Planning (ERP) master data.

In some variations, the master data comprises customer data, vendor data, and contact person data.

In some variations, the validation comprises checking for errors in the master data, and logging error messages for erroneous data.

In some variations, the mapping comprises converting the master data to business partner specific data.

In some variations, the insertion comprises updating business partner tables in the target database with the mapped master data.

In some variations, the method further comprises automating a maintenance of configuration settings associated with an organization and the master data with minimum manual intervention.

In another aspect, there is provided a non-transitory computer-readable medium storing instructions, which when executed by at least one data processor, result in operations comprising: extracting the master data from a source database; validating the extracted master data at a database layer; mapping the validated master data to a target database specific datasets, and, inserting the mapped master data into the target database, wherein the extraction, validation, mapping, and insertion are performed at the database layer.

In some variations, the operations further comprise validating the inserted data against a data model of the target system to ensure data integrity and accuracy.

In some variations, the master data is Enterprise Resource Planning (ERP) master data.

In some variations, the master data comprises customer data, vendor data, and contact person data.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
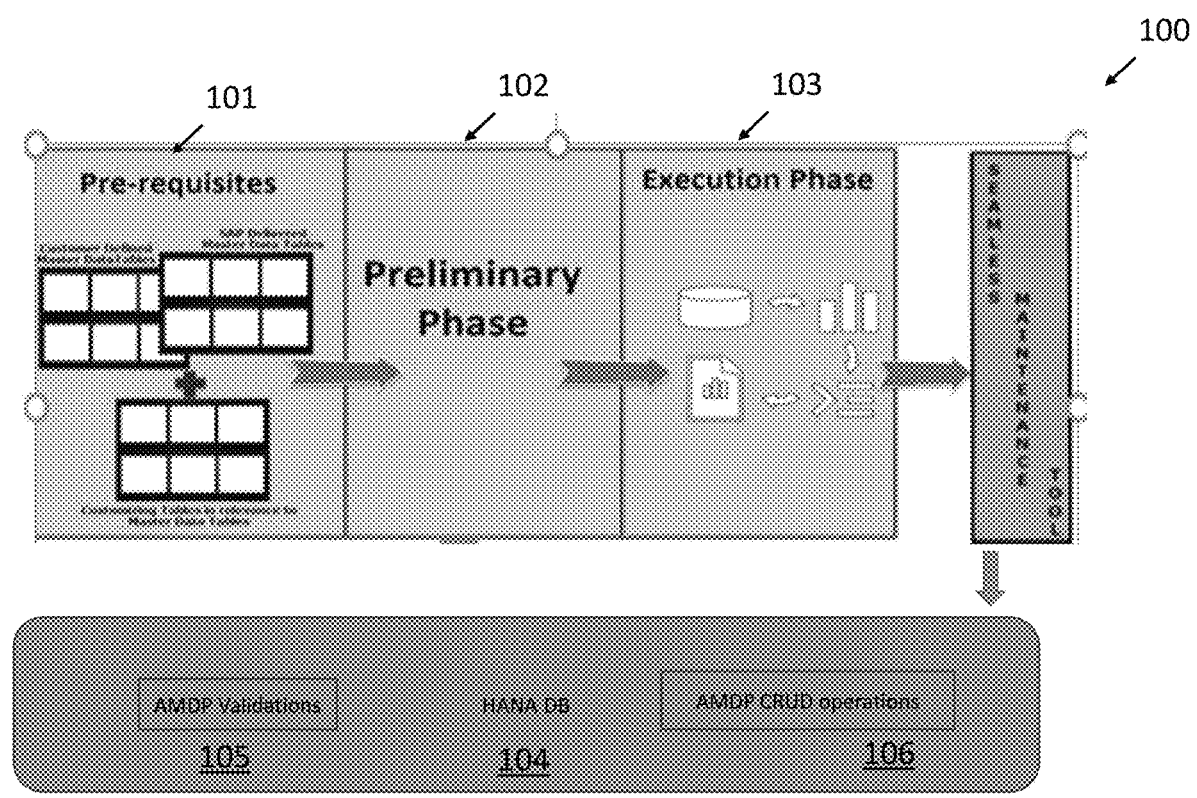
FIG. 1 depicts a diagram illustrating a data migration process, according to one or more embodiments of the present disclosure.

As discussed herein elsewhere, ERP systems are comprehensive software solutions that integrate and manage the various processes of an organization into a single system. Master data is a type of data that is shared by multiple processes and systems within an organization. In the context of ERP systems, master data typically includes information about customers, vendors, products, employees, and other entities that are involved in the organization's business processes. Master data is a foundational component of ERP systems, as it provides the data that is used by the various modules of the system.

S/4HANA is an ERP system developed by SAP SE. In some implementations, it is built on the SAP HANA database, which is an in-memory database that allows for the processing of high volumes of data in real-time. S/4HANA is designed to integrate various business processes and provide real-time analytics and insights.

Data migration is a process that involves moving data from one system or format to another. In the context of ERP systems, data migration typically involves moving data from an existing ERP system to a new ERP system, such as a target system comprising S/4HANA. This process can be complex and time-consuming, particularly when dealing with large volumes of data. Advanced SQL Scripting (AMDP) is a technology that allows for the execution of database procedures and functions directly in the database layer. This can provide performance benefits, particularly when dealing with large volumes of data, as it reduces the amount of data that has to be transferred between the application layer and the database layer. In some implementations, the term "Brownfield Migration" may refer to a type of migration where an existing system is upgraded or converted to a new system, as opposed to a "Greenfield Migration", where a new system is implemented from scratch.

In one aspect, the subject matter provided herein features migrating ERP master data to a target system (e.g., S/4HANA). In some embodiments, this may involves extracting the ERP master data from a source database, validating the extracted ERP master data at the database layer, mapping the validated ERP master data to target system specific datasets, and inserting the mapped ERP master data into a target database. The extraction, validation, mapping, and insertion are performed using Advanced SQL Scripting (AMDP) at the database layer, with both the source and target databases being HANA databases.

Embodiments of the method may include one or more of the following features. The ERP master data may include customer data, vendor data, and contact person data. The validation may include checking for errors in the ERP master data, and logging error messages for erroneous data. The mapping may include converting the ERP master data to Business Partner specific data. The insertion may include updating Business Partner tables in the target database with the mapped ERP master data.

In another aspect, the method may further include automating the maintenance of customizing data and master data with minimum manual intervention. The migration may be performed for a Brownfield Migration, where the current ERP system is converted to a target database. The migration may be performed without causing downtime during business operations. The migration may be performed for a large volume of ERP master data, and the migration process may be performance efficient due to the operations being performed at the database layer.

In yet another aspect, the system features a source HANA database storing the ERP master data, a target HANA database, and an AMDP module. The AMDP module is configured to extract the ERP master data from the source database, validate the extracted ERP master data, map the validated ERP master data to target database specific datasets, and insert the mapped ERP master data into the target database.

Embodiments of the system may include one or more of the following features. The AMDP module may be further configured to automate the maintenance of customizing data and master data with minimum manual intervention. The AMDP module may be further configured to perform the migration without causing downtime during business operations. The AMDP module may be further configured to perform the migration for a large volume of ERP master data, and the migration process may be performance efficient due to the operations being performed at the database layer.

In some embodiments, customizing data refers to the configuration settings that are specific to an organization's use of the ERP system. This can include settings related to the organization's business processes, user interfaces, and data structures. The maintenance of this customizing data involves the updating of these settings as the organization's requirements change over time. The system also allows for the automation of the maintenance of customizing data with minimum manual intervention.

FIG. 1 depicts a diagram illustrating a data migration process, according to one or more embodiments of the present disclosure. As shown in FIG. 1, in the prerequisites stage 101 of the data migration process, the system 100 may obtain multiple tables. In some embodiments, these tables comprise customer defined master data tables, system delivered master data tables, and/or customizing tables in relevance to master data tables. In some embodiments, with these tables available, the system may undergo a preliminary stage 102, wherein the system 100 may automate fundamental customizations like number ranges, account groups, Business Partner groupings, and role groupings, which may be needed to streamline the data migration process for greater convenience. In some embodiments, in the execute stage 103, the system 100 may transform customer and supplier data into business partner format, utilizing the customizations prepared during the preliminary phase, to prepare the system for the target system (e.g., a system comprising a database such as an in-memory database, for example a S/4HANA database) upgrade. The system may then, in some embodiments, migrate ERP master data to HANA database 104. Advanced SQL Scripting (AMDP) techniques, also known as ABAP Managed Database Procedures, may be employed to perform at least validation process. AMDP 105 is a technology that allows for the execution of database procedures and functions directly in the database layer. Create, Read, Update, and Delete (CRUD) functionalities and/or operations 106 of the database may be employed to facilitate the data migration.

Figure 2:
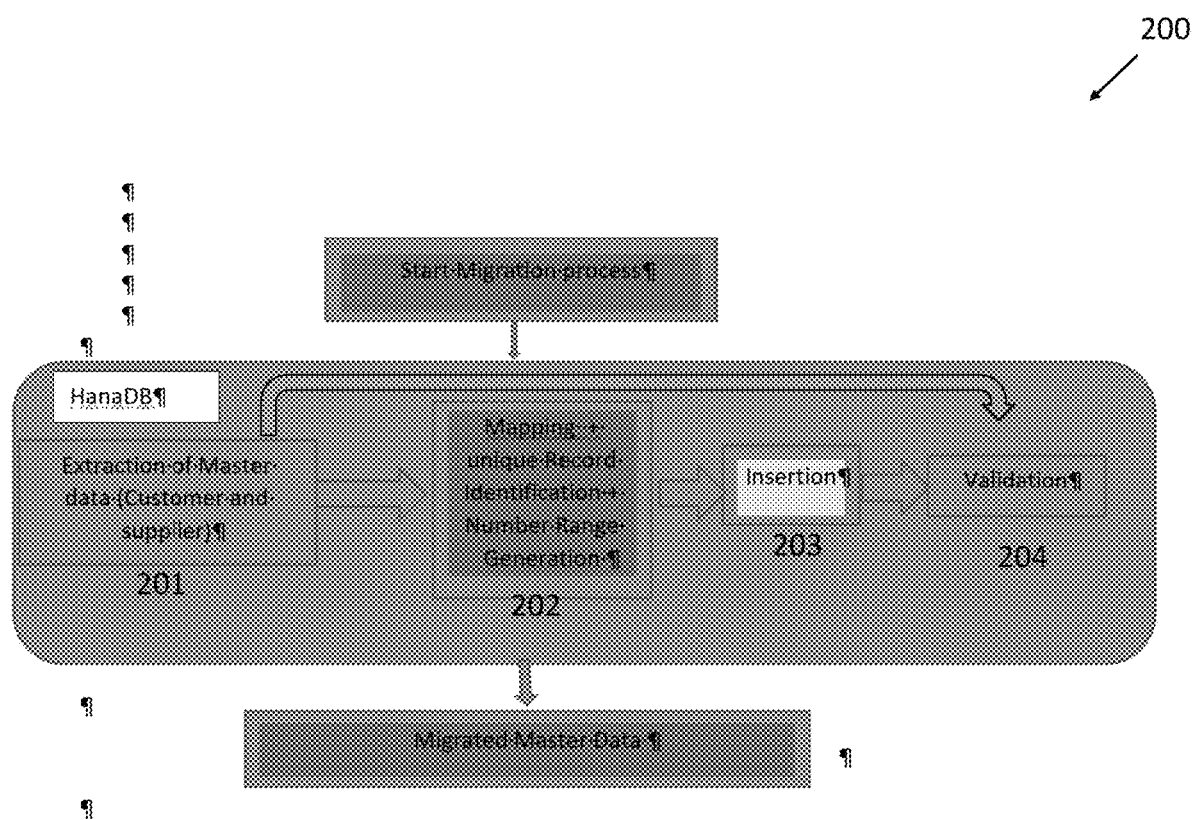
FIG. 2 depicts a block diagram illustrating an example databases and data flows for data migration, according to one or more embodiments of the present disclosure.

FIG. 2 depicts a block diagram illustrating an example databases and data flows for data migration, according to one or more embodiments of the present disclosure. As shown in FIG. 2, the process of migrating ERP master data to the target system may involve several steps, each of which may be performed at the database layer using Advanced SQL Scripting (AMDP). The source and target databases for this process can both be HANA databases, which are known for their high performance and in-memory capabilities. In some embodiments, the operations starts with the extraction 201 of ERP master data from the source database. This data can include a variety of information, such as customer data, vendor data, and contact person data. The extraction process is designed to pull this data from the source database in a manner that is efficient and minimizes the potential for data loss or corruption.

Once the ERP master data has been extracted, it is then validated 204 at the database layer. In some embodiments, this validation process 204 may check the extracted data for errors and inconsistencies. If any errors are found, the errors are logged for further investigation and correction. This validation step 204 is a pivotal part of the migration process, and it ensures that the data being migrated is accurate and reliable.

After the ERP master data has been validated, it may then be mapped 202 to target system specific datasets. This mapping process 202 may involve converting the ERP master data into a format that is compatible with the target system (e.g., a system comprising a database such as an in-memory database, for example a S/4HANA database). For example, all customer, vendor, and contact person data is converted to business partner specific data, which may be a mandatory object in S/4HANA.

The operation may proceed to the insertion 203 of the mapped ERP master data into the target database. This may involve updating the business partner tables in the target database with the mapped ERP master data. This insertion process 203 is performed at the database layer using AMDP, which helps to ensure that the data is inserted into the target database in a manner that is efficient and minimizes the potential for data loss or corruption. As such, the migration process is able to achieve a high level of performance efficiency. This is particularly beneficial when migrating a large volume of ERP master data, as it helps to minimize the time and resources that are consumed by the migration process.

Following the insertion 203 of the mapped ERP master data into the target database, the system may proceed to a validation operation 204. This validation operation 204 is designed to ensure the integrity and accuracy of the inserted data, and is performed at the database layer, similar to the insertion process 203. The validation process 204 may involve comparing the inserted data against a data model of the target system. This data model provides a structured representation of the data requirements and constraints of the target system. By comparing the inserted data against this model, the system can verify that the data conforms to the expected structure, format, and other requirements of the target system. Any discrepancies or errors detected during this validation process are logged and reported for further investigation and resolution. This ensures that any issues with the migrated data are promptly identified and addressed, thereby maintaining the integrity and accuracy of the data in the target system. By performing the validation process 204 at the database layer using AMDP, the system is able to achieve a high level of performance efficiency. This is particularly beneficial when validating a large volume of inserted ERP master data, as it helps to minimize the time and resources consumed by the validation process. As such, the system ensures a seamless, efficient, and reliable migration of ERP master data to the target system.

As described herein elsewhere, the types of ERP master data that can be migrated in this process are diverse and encompass a wide range of information that is integral to the functioning of an organization. This includes, but is not limited to, customer data, vendor data, and contact person data. Customer data is a broad category that includes information about an organization's customers. This can include basic information such as names and contact details, as well as more detailed information such as purchase history, preferences, and interactions with the organization. This data is a valuable resource for an organization, as it can be used to understand customer behavior, improve customer service, and drive sales and marketing efforts. Vendor data, on the other hand, includes information about the suppliers and service providers that an organization works with. This can include details such as vendor names, contact information, products or services provided, pricing information, and contract terms. This data is used to manage relationships with vendors, negotiate contracts, and ensure that the organization is getting the goods and services it requires at the right price and quality. Contact person data refers to information about individuals who are the primary points of contact for a customer or vendor. This can include names, job titles, contact details, and notes about interactions with these individuals. This data is used to manage relationships with customers and vendors, and to ensure that communication and interactions are directed to the right individuals.

In some embodiments, these types of ERP master data are converted to business partner specific data during the migration process. This is because in the target system (e.g., a system comprising a database such as an in-memory database, for example a S/4HANA database), the business partner is the leading object, and all data related to customers, vendors, and contact persons is managed in relation to this object. This conversion process ensures that the migrated data is compatible with the structure and requirements of the target system (e.g., a system comprising a database such as an in-memory database, for example a S/4HANA database), and that it can be effectively used in the new system.

As discuss herein elsewhere, the validation of the extracted ERP master data is a pivotal step in the migration process. This operation is performed at the database layer using Advanced SQL Scripting (AMDP). The validation process is designed to ensure the accuracy and reliability of the data being migrated, which is of priority for the successful migration of ERP master data to the target system. The validation process begins with the checking of the extracted ERP master data for any errors or inconsistencies. This involves a thorough examination of the data to identify any discrepancies or anomalies that could potentially lead to issues during the migration process. The checking process is performed using a set of predefined rules and criteria that are designed to identify common types of errors in ERP master data, such as missing or incomplete data, incorrect data formats, and inconsistencies between related data fields. If any errors are identified during the checking process, they are logged for further investigation and correction. The logging of error messages is an integral part of the validation process, as it provides a record of any issues that were identified and allows for the tracking of their resolution. The error messages include detailed information about the nature of the error, the data field or fields that are affected, and the specific record or records in the ERP master data that contain the error. This information is invaluable for the troubleshooting and correction of errors, and it helps to ensure that the migrated data is accurate and reliable. Once the errors have been logged, they are then corrected before the data is mapped to the target system specific datasets. The correction process involves modifying the erroneous data to resolve the identified issues, or in some cases, removing the erroneous data from the ERP master data altogether. The corrected data is then re-validated to ensure that the issues have been properly resolved and that the data is now ready for the mapping process. By performing the validation process at the database layer using AMDP, the migration process is able to achieve a high level of efficiency and accuracy. This approach allows for the rapid identification and correction of errors, and it ensures that the migrated data is of the high quality that is expected in a target system (e.g., a system comprising a database such as an in-memory database, for example a S/4HANA database).

Following the validation of the extracted ERP master data, the next step in the migration process is the mapping of this data to target system specific datasets. In some embodiments, this mapping may involve the conversion of the ERP master data into a format that is compatible with the target system (e.g., a system comprising a database such as an in-memory database, for example a S/4HANA database). Alternatively or additionally, the ERP master data, which includes customer data, vendor data, and contact person data, is converted to business partner specific data. The mapping process is performed using Advanced SQL Scripting (AMDP) at the database layer. This approach allows for the efficient and accurate conversion of the ERP master data, and it ensures that the data is in a format that can be effectively used in the target system (e.g., a system comprising a database such as an in-memory database, for example a S/4HANA database). The conversion of the ERP master data to B business partner specific data involves a series of operations. First, the ERP master data is analyzed to identify the relevant data fields that correspond to the business partner object in a target system (e.g., a system comprising a database such as an in-memory database, for example a S/4HANA database). These data fields include, but are not limited to, customer names, vendor names, contact person details, and other related information. Once the relevant data fields have been identified, they are then mapped to the corresponding fields in the business partner object. This mapping operation involves the creation of a correspondence between the data fields in the ERP master data and the data fields in the business partner object. This correspondence is used to guide the conversion of the ERP master data to business partner specific data.

Although some of the examples refer to ERP master data, other types of master data corresponding to inventory management, human resources, or financial accounting may be used as well. Moreover, although some of the examples refer to S/4HANA, other types of ERP systems such as Oracle ERP Cloud, Microsoft Dynamics 365, or Infor CloudSuite may also be applicable. The described methods and systems are not limited to the specific examples provided, but rather, they can be utilized with a variety of applications and in numerous contexts. The scope of the patent document is not limited to the specific scenarios and systems described herein.

After the mapping operation, the ERP master data is then converted to data specific to a given user, such as Business Partner specific data. This conversion process involves the transformation of the data values in the ERP master data to match the format and structure of the Business Partner object in the target system (e.g., S/4HANA). This transformation is performed using a set of predefined rules and algorithms that are designed to ensure the accurate and reliable conversion of the data. By performing the mapping process at the database layer using AMDP, the migration process is able to achieve a high level of efficiency and accuracy. This approach allows for the rapid and accurate conversion of the ERP master data to Business Partner specific data, and it ensures that the migrated data is in a format that is compatible with the structure and requirements of the target system.

Once the ERP master data has been mapped to the target system specific datasets, the next step in the migration process is the insertion of this mapped data into the target database. This insertion process is a pivotal operation that involves the updating of business partner tables in the target database with the mapped ERP master data. The insertion process is performed using Advanced SQL Scripting (AMDP) at the database layer. This approach allows for the efficient and accurate insertion of the mapped ERP master data into the target database, and it ensures that the data is in a format that can be effectively used in the target system. The first step in the insertion process is the identification of the target business partner tables in the target database. These tables are the destination for the mapped ERP master data, and they are designed to store business partner specific data in a format that is compatible with the target system (e.g., a system comprising a database such as an in-memory database, for example a S/4HANA database). The target business partner tables include, but are not limited to, tables for storing customer data, vendor data, and contact person data. Once the target business partner tables have been identified, the mapped ERP master data is then inserted into these tables. This insertion operation involves the updating of the business partner tables with the mapped ERP master data. This updating process is performed using a set of predefined rules and algorithms that are designed to ensure the accurate and reliable insertion of the data. During the insertion process, the mapped ERP master data is transformed into a format that matches the structure of the business partner tables in the target database. This transformation process involves the conversion of the data values in the mapped ERP master data to match the format and structure of the business partner tables. By performing the insertion process at the database layer using AMDP, the migration process is able to achieve a high level of efficiency and accuracy. This approach allows for the rapid and accurate insertion of the mapped ERP master data into the target database, and it ensures that the migrated data is in a format that is compatible with the structure and requirements of the target system (e.g., a system comprising a database such as an in-memory database, for example a S/4HANA database). In addition to the migration of ERP master data, the system also facilitates the automation of the maintenance of customizing data and master data. This automation process is designed to minimize manual intervention, thereby increasing efficiency and reducing the potential for errors.

After the mapped ERP master data is inserted into the target database, a validation operation is carried out. This operation is designed to ensure the integrity and accuracy of the inserted data and is performed at the database layer, similar to the insertion process. The validation process involves comparing the inserted data against a data model of the target system, which provides a structured representation of the data requirements and constraints of the target system. By comparing the inserted data against this model, the system can verify that the data conforms to the expected structure, format, and other requirements of the target system. Any discrepancies or errors detected during this validation process are logged and reported for further investigation and resolution. This ensures that any issues with the migrated data are promptly identified and addressed, thereby maintaining the integrity and accuracy of the data in the target system.

Customizing data refers to the configuration settings that are specific to an organization's use of the ERP system. This can include settings related to the organization's business processes, user interfaces, and data structures. The maintenance of this customizing data involves the updating of these settings as the organization's requirements change over time. By automating this maintenance process, the system ensures that the customizing data is kept up-to-date and aligned with the organization's current requirements. Master data, on the other hand, refers to the core data that is used across the organization's business processes. This can include data related to customers, vendors, products, and other business entities. The maintenance of this master data involves the updating of this data as new information becomes available or as existing information changes. By automating this maintenance process, the system ensures that the master data is kept accurate and current, which is pivotal for the effective operation of the organization's business processes. The automation of the maintenance of customizing data and master data is achieved through the use of Advanced SQL Scripting (AMDP) at the database layer. This approach allows for the efficient and accurate updating of the data, and it minimizes the potential for errors that can occur with manual data maintenance processes. The automation process involves the use of predefined rules and algorithms that are designed to guide the updating of the data, and it can be configured to run on a scheduled basis or in response to specific triggers. By automating the maintenance of customizing data and master data, the system not just facilitates the migration of ERP master data to the target system, but also ensures that the migrated data remains accurate and up-to-date in the new system. This automation process is a pivotal feature of the system, as it helps to ensure the ongoing accuracy and reliability of the data in the target system. The migration process can be performed in different ways, depending on the specific requirements and circumstances of the organization. One of the types of migrations that can be performed is known as a Brownfield Migration. In a Brownfield Migration, the current ERP system is converted to a target system (e.g., a system comprising a database such as an in-memory database, for example a S/4HANA database).

In a Brownfield Migration, the existing ERP system, which is already in use by the organization, is transformed into a target database. This transformation process involves the migration of the ERP master data from the existing ERP system to the new target system. The migrated data includes customer data, vendor data, and contact person data, which are converted to business partner specific data in the target system. The Brownfield Migration process is performed using Advanced SQL Scripting (AMDP) at the database layer. This approach allows for the efficient and accurate migration of the ERP master data, and it ensures that the data is in a format that can be effectively used in the target system. The migration process involves the extraction of the ERP master data from the source database, the validation of the extracted data, the mapping of the validated data to target specific datasets, and the insertion of the mapped data into the target database. By performing the migration process at the database layer using AMDP, the Brownfield Migration process is able to achieve a high level of performance efficiency. This is particularly beneficial when migrating a large volume of ERP master data, as it helps to minimize the time and resources that are consumed by the migration process. Furthermore, the Brownfield Migration process is designed to be performed without causing downtime during business operations, which is a pivotal consideration for organizations that rely on their ERP system for their day-to-day operations.

It is worth noting that the Brownfield Migration process may require the source ERP system to be on a specific database (e.g., a HANA database). This is because the migration process leverages the capabilities of the HANA database, such as its high performance and in-memory capabilities, to perform the migration operations. Therefore, organizations that wish to perform a Brownfield Migration may first want to verify that their existing ERP system is on a HANA database. The performance efficiency of the migration process is a pivotal aspect, especially when dealing with a large volume of ERP master data. The operations being performed at the database layer using Advanced SQL Scripting (AMDP) contribute significantly to this efficiency. The migration process involves the extraction of ERP master data from the source database, the validation of the extracted data, the mapping of the validated data to target system specific datasets, and the insertion of the mapped data into the target database. All these operations are performed at the database layer, which is a distinguishing feature of this migration process.

Advanced SQL Scripting (AMDP) is a framework that allows developers to create and execute database procedures directly in the SAP HANA database. AMDP procedures are written in SQLScript, a proprietary, procedural extension of SQL that is used in the some specific database (e.g., SAP HANA database). Using AMDP allows for the execution of complex calculations and operations directly on the database server, which can significantly improve performance by reducing the amount of data that has to be transferred between the application server and the database server.

The "database layer" refers to the level in a software system where data is stored and managed. In a typical three-tier architecture, the database layer is the bottom layer, which interacts directly with the database to perform operations such as data retrieval, insertion, update, and deletion. This is in contrast to the application layer, which contains the business logic of the application, and the presentation layer, which is responsible for displaying the data to the user. By performing operations at the database layer, the system can bypass the application layer, resulting in more efficient data processing.

Performing operations at the database layer offers several advantages. For example, it may reduce the amount of data movement between the application layer and the database layer. This is particularly beneficial when dealing with a large volume of ERP master data, as it minimizes the time and resources consumed by the data movement. Further, it allows for the use of the high-performance capabilities of the HANA database, such as its in-memory processing capabilities, which can significantly speed up the migration process. Additionally, it enables the use of Advanced SQL Scripting (AMDP), which provides a powerful and flexible tool for performing complex data operations. For instance, during the extraction process, the ERP master data is fetched directly from the source HANA database using AMDP. This direct extraction at the database layer eliminates the time-consuming process of transferring the data to the application layer for processing. Similarly, during the validation process, the extracted ERP master data is checked for errors directly at the database layer using AMDP. This direct validation at the database layer not just speeds up the validation process, but also reduces the risk of data corruption that can occur during data movement. During the mapping process, the validated ERP master data is converted to the target system specific datasets directly at the database layer using AMDP. This direct mapping at the database layer ensures that the conversion process is performed efficiently, even for a large volume of ERP master data. Furthermore, during the insertion process, the mapped ERP master data is inserted into the target HANA database directly at the database layer using AMDP. This direct insertion at the database layer ensures that the data is inserted into the target database in a manner that is efficient and minimizes the potential for data loss or corruption.

By performing all these operations at the database layer using AMDP, the migration process is able to achieve a high level of performance efficiency. This is particularly beneficial when migrating a large volume of ERP master data, as it helps to minimize the time and resources that are consumed by the migration process. Furthermore, this approach allows the migration process to be performed without causing downtime during business operations, which is a pivotal consideration for organizations that rely on their ERP system for their day-to-day operations. The system for migrating ERP master data to target system comprises several components, each playing a pivotal role in the migration process. The first component is the source HANA database, which stores the ERP master data. This database is the starting point of the migration process, providing the raw data that is to be migrated to the target system. The source HANA database is designed to store a wide range of ERP master data, including customer data, vendor data, and contact person data. This data is stored in a structured format that facilitates efficient extraction and validation. The second component of the system is the target HANA database. This is the destination for the ERP master data that has been extracted, validated, and mapped to target system specific datasets. The target HANA database is designed to store business partner specific data, which is the format of the ERP master data after it has been mapped to target system specific datasets. The target HANA database is structured to facilitate the efficient insertion.

Figure 3:
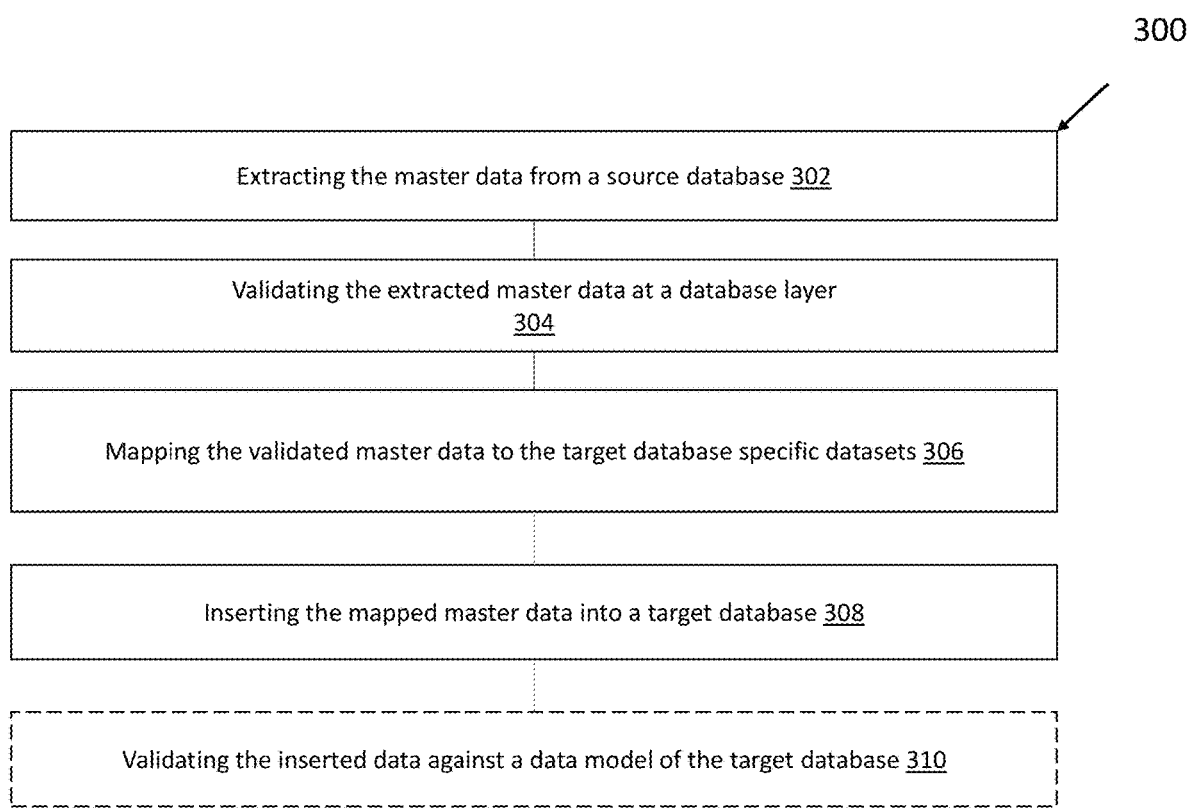
FIG. 3 depicts an example flowchart illustrating a process for data migration, according to one or more embodiments of the present disclosure.

FIG. 3 depicts an example flowchart illustrating a process for data migration, according to one or more embodiments of the present disclosure. As shown in FIG. 3, the data migration process 300 may begin with operation 302, wherein the system extracts the ERP master data from a source database. The source database is the original location where this data is stored. This extraction process is performed by a data extraction tool within the system, which is designed to pull data out of a database. An alternative to this could be manual extraction, although this is typically more time-consuming and prone to errors. For example, the system might extract customer and vendor master data from an Oracle database.

Next, in operation 304, the system may validate the extracted ERP master data at a database layer. Validation is the process of checking if the data meets a set of defined standards or rules. This is performed by a validation tool within the system, which checks the data for errors or inconsistencies. For example, the system might validate that all customer names in the extracted data are formatted correctly.

In operation 306, the system maps the validated ERP master data to target system specific datasets. Mapping is the process of matching the data from the source database to the corresponding fields in the target database. This is performed by a data mapping tool within the system, which is designed to create a link between two distinct data models. For example, the system might map the customer names from the source database to the 'Business Partner' field in the target system database.

Next, in operation 308, the system inserts the mapped ERP master data into a target database. The target database is the final location where the data will be stored after the migration process. This is performed by a data insertion tool within the system, which is designed to load data into a database. An alternative to this could be manual insertion, although this is typically more time-consuming and prone to errors. For example, the system might insert the mapped customer data into a target database.

Additionally or alternatively, in an optional operation 310, the system validating the inserted data. In some embodiments, this validation process is designed to ensure the integrity and accuracy of the inserted data, and is performed at the database layer, similar to the insertion process. The validation process involves comparing the inserted data against a data model of the target system. This data model provides a structured representation of the data requirements and constraints of the target system. By comparing the inserted data against this model, the system can verify that the data conforms to the expected structure, format, and other requirements of the target system. Any discrepancies or errors detected during this validation process are logged and reported for further investigation and resolution. This ensures that any issues with the migrated data are promptly identified and addressed, thereby maintaining the integrity and accuracy of the data in the target system.

In some instances, the extraction, validation, mapping, and insertion may be performed using Advanced SQL Scripting (AMDP) at the database layer. AMDP is a framework for managing and running database procedures. The source and target databases in this case are target databases, which are in-memory databases developed by SAP. This approach allows for a more efficient and streamlined data migration process.

Figure 4:
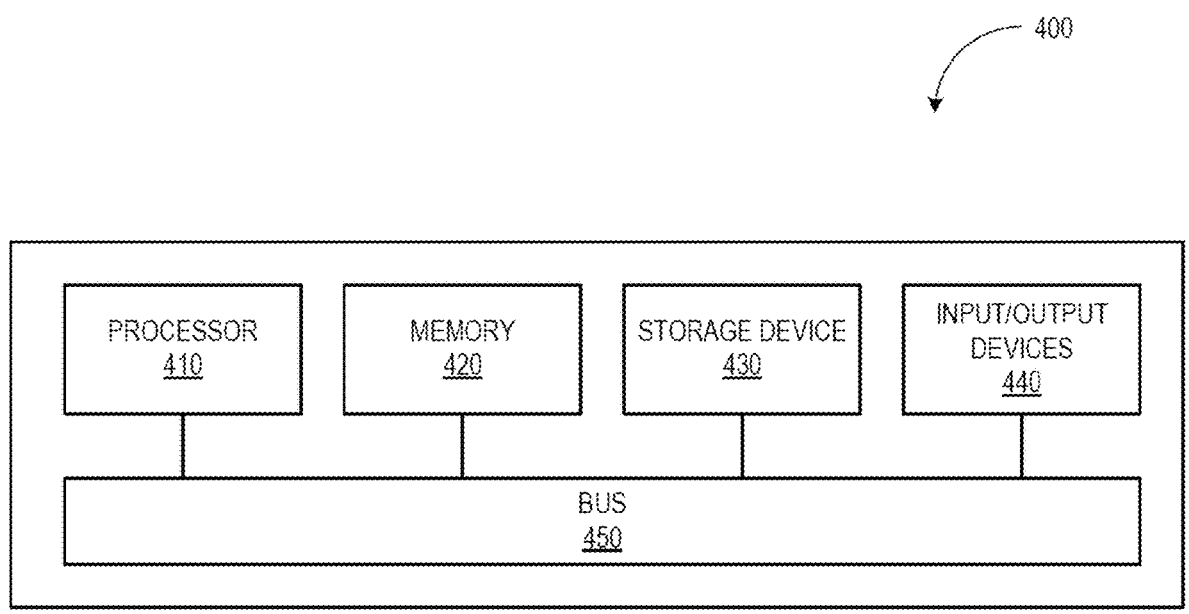
FIG. 4 depicts a block diagram for a database management system, in accordance with some example embodiments.

FIG. 4 depicts a block diagram illustrating a computing system 400 consistent with implementations of the current subject matter. Referring to FIGS. 1, 2, and 3, the computing system 400 can be used to implement the method, systems and/or any components therein.

As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the computing platform 110. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a solid-state device, a floppy disk device, a hard disk device, an optical disk device, a tape device, and/or any other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system for managing data persistence formats in a computing system, comprising:
at least one data processor; and
at least one memory result in operations comprising:
extracting the master data from a source database;
validating the extracted master data at a database layer;
mapping the validated master data to the target database specific datasets, and
inserting the mapped master data into a target database, wherein the extraction, validation, mapping, and insertion are performed at the database layer.

Example 2: The system of Example 1, wherein the operations further comprise validating the inserted data against a data model of the target system to ensure data integrity and accuracy.

Example 3: The system of any of Examples 1-2, wherein the master data is Enterprise Resource Planning (ERP) master data.

Example 4: The system of any of Examples 1-3, wherein the master data comprises customer data, vendor data, and contact person data.

Example 5: The system of any of Examples 1-4, wherein the validation comprises checking for errors in the master data, and logging error messages for erroneous data.

Example 6: The system of any of Examples 1-5, wherein the mapping comprises converting the master data to business partner specific data.

Example 7: The system of any of Examples 1-6, wherein the insertion comprises updating business partner tables in the target database with the mapped master data.

Example 8: The system of any of Examples 1-7, wherein the operations further comprise automating a maintenance of configuration settings associated with an organization and the master data with minimum manual intervention.

Example 9: A computer-implemented method, comprising
extracting the master data from a source database;
validating the extracted master data at a database layer;
mapping the validated master data to the target database specific datasets, and
inserting the mapped master data into a target database, wherein the extraction, validation, mapping, and insertion are performed at the database layer.

Example 10: The method of Example 9, wherein the method comprises validating the inserted data against a data model of the target system to ensure data integrity and accuracy.

Example 11: The method of any of Examples 9-10, wherein the master data is Enterprise Resource Planning (ERP) master data.

Example 12: The method of any of Examples 9-11, wherein the master data comprises customer data, vendor data, and contact person data.

Example 13: The method of any of Examples 9-12, wherein the validation comprises checking for errors in the master data, and logging error messages for erroneous data.

Example 14: The method of any of Examples 9-13, wherein the mapping comprises converting the master data to business partner specific data.

Example 15: The method of any of Examples 9-14, wherein the insertion comprises updating business partner tables in the target database with the mapped master data.

Example 16: The method of any of Examples 9-15, further comprising automating a maintenance of configuration settings associated with an organization and the master data with minimum manual intervention.

Example 17: A non-transitory computer-readable medium storing instructions, which when executed by at least one data processor, result in operations comprising:
at least one data processor; and
at least one memory result in operations comprising:
extracting the master data from a source database;
validating the extracted master data at a database layer;
mapping the validated master data to the target database specific datasets, and
inserting the mapped master data into a target database, wherein the extraction, validation, mapping, and insertion are performed at the database layer.

Example 18: The method of Example 17, wherein the operations further comprise validating the inserted data against a data model of the target system to ensure data integrity and accuracy.

Example 19: The method of any of Examples 17-18, wherein the master data is Enterprise Resource Planning (ERP) master data.

Example 20: The method of any of Examples 17-19, the master data comprises customer data, vendor data, and contact person data.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system for migrating master data to a target system, comprising:
    at least one data processor; and
    at least one memory result in operations comprising:
        extracting the master data from a source database;
        validating the extracted master data at a database layer;
        mapping the validated master data to a target database specific datasets, and
        inserting the mapped master data into the target database,
        wherein the extraction, validation, mapping, and insertion are performed at the database layer.
2. The system of claim 1, wherein the operations further comprise validating the inserted mapped master data against a data model of the target database to ensure data integrity and accuracy.
3. The system of claim 1, wherein the master data is Enterprise Resource Planning (ERP) master data.
4. The system of claim 1, wherein the master data comprises customer data, vendor data, and contact person data.
5. The system of claim 1, wherein the validation comprises checking for errors in the master data, and logging error messages for erroneous data.
6. The system of claim 1, wherein the mapping comprises converting the master data to business partner specific data.
7. The system of claim 1, wherein the insertion comprises updating business partner tables in the target database with the mapped master data.
8. The system of claim 1, wherein the operations further comprise:
    automating a maintenance of configuration settings associated with an organization and the master data with minimum manual intervention.
9. A computer-implemented method for migrating master data to a target system, comprising:
    extracting the master data from a source database;
    validating the extracted master data at a database layer;
    mapping the validated master data to a target database specific datasets, and
    inserting the mapped master data into the target database,
    wherein the extraction, validation, mapping, and insertion are performed at the database layer.
10. The method of claim 9, further comprises validating the inserted mapped master data against a data model of the target database to ensure data integrity and accuracy.
11. The method of claim 9, wherein the master data is Enterprise Resource Planning (ERP) master data.
12. The method of claim 9, wherein the master data comprises customer data, vendor data, and contact person data.
13. The method of claim 9, wherein the validation comprises checking for errors in the master data, and logging error messages for erroneous data.
14. The method of claim 9, wherein the mapping comprises converting the master data to business partner specific data.
15. The method of claim 9, wherein the insertion comprises updating business partner tables in the target database with the mapped master data.
16. The method of claim 9, further comprising automating a maintenance of configuration settings associated with an organization and the master data with minimum manual intervention.
17. A non-transitory computer-readable medium storing instructions, which when executed by at least one data processor, result in operations comprising:
    extracting master data from a source database;
    validating the extracted master data at a database layer;
    mapping the validated master data to a target database specific datasets, and
    inserting the mapped master data into the target database,
    wherein the extraction, validation, mapping, and insertion are performed at the database layer.
18. The non-transitory computer-readable medium of claim 17, wherein the operations further comprise validating the inserted mapped master data against a data model of the target database to ensure data integrity and accuracy.
19. The non-transitory computer-readable medium of claim 17, wherein the master data is Enterprise Resource Planning (ERP) master data.
20. The non-transitory computer-readable medium of claim 17, the master data comprises customer data, vendor data, and contact person data.

* * * * *